May 18, 1943. A. P. ADNEY 2,319,574
DISCHARGE VALVE FOR PUMPS
Filed Dec. 26, 1941
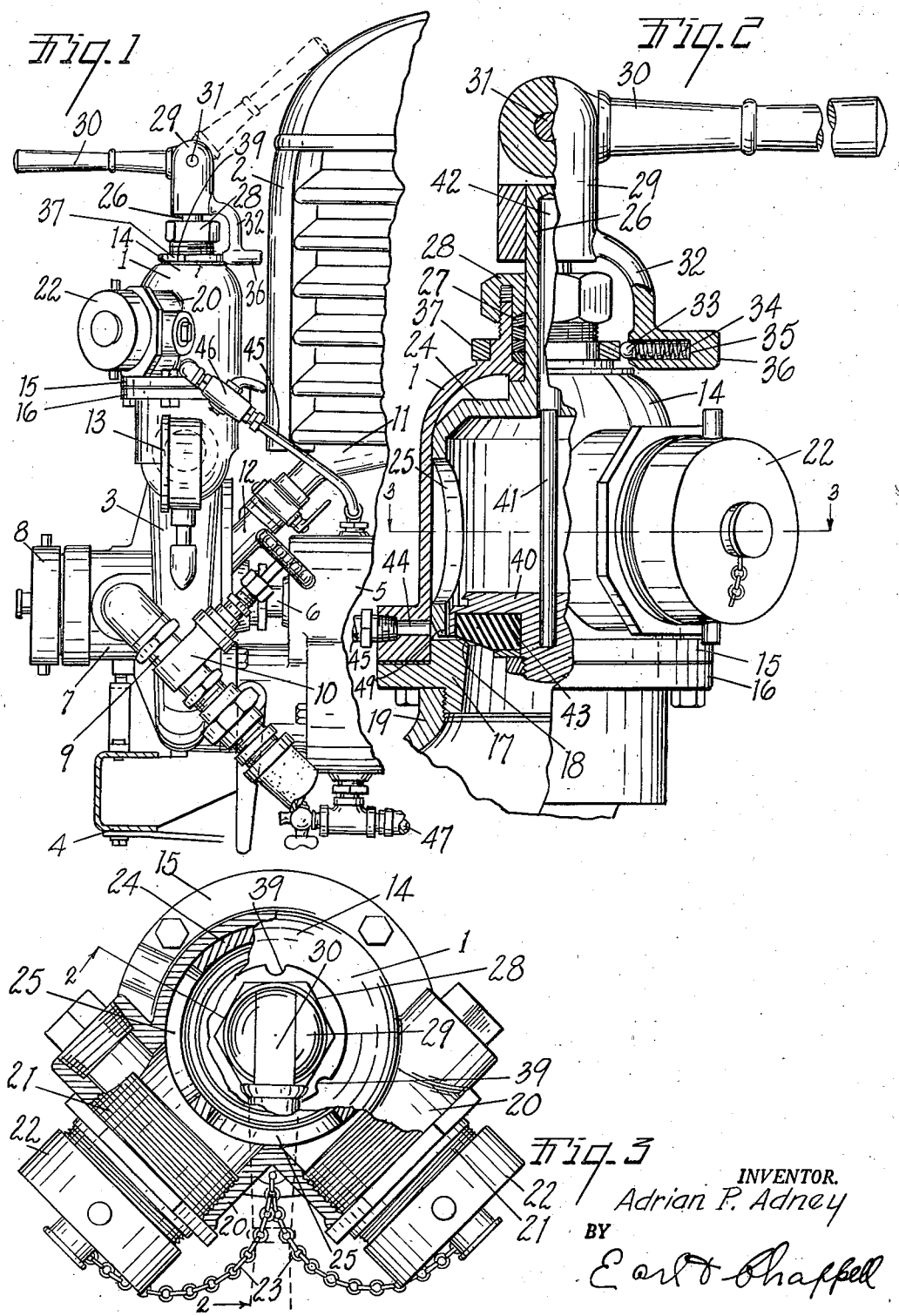
INVENTOR.
Adrian P. Adney
BY
Earl T. Chappell Patented May 18, 1943

2,319,574

UNITED STATES PATENT OFFICE 2,319,574

DISCHARGE VALVE FOR PUMPS

Adrian P. Adney, Battle Creek, Mich., assignor to American-Marsh Pumps, Inc., Battle Creek, Mich., a corporation of Michigan Application December 26, 1941, Serial No. 424,449

8 Claims. (Cl. 251—150)

This invention relates to improvements in discharge valves for pumps.

The main objects of this invention are:

First, to provide an improved discharge or control valve for pumps of the rotatable Siamese type which permits complete actuation of 360° even though the valve be positioned closely adjacent to an object such as the grill or radiator of an automotive vehicle on which the pump is mounted.

Second, to provide a structure of this type having indicating means permitting the visual determination of the position of the valve without regard to the position of the operating handle.

Objects relating to details and economies of the invention will appear from the description to follow. The invention is defined and pointed out in the claims.

A structure which is a preferred embodiment of the invention is illustrated in the accompanying drawing, in which:

Fig. 1 is a fragmentary view in side elevation of an automotive pumping apparatus embodying the features of the invention, my improved valve being positioned in operative relation to the pump forwardly of the radiator grill of the automotive vehicle, the valve handle being shown in one of its adjusted positions by full lines, it being shown in another position by dotted lines to show that it cannot be manipulated throughout the full operation of the valve of 360°.

Fig. 2 is an enlarged fragmentary view partially broken away and in section on a line corresponding to the broken line 2—2 of Fig. 3 illustrating certain details of the valve and the valve actuating and position indicating means.

Fig. 3 is a fragmentary horizontal section on line 3—3 of Fig. 2.

My invention relates primarily to a valve of the Siamese type to be incorporated in pumping apparatus such as fire apparatus although it is adapted for use on pumping apparatus generally—that is, such as used in construction work for draining ditches or excavations or the like. This Siamese type valve is designed for controlling the discharge of water through either one or the other of the two discharge ports or through both thereof or to cut off the discharge.

The apparatus in which I have illustrated my invention and for which it is particularly designed is adapted to be mounted at the front end of an automotive vehicle such as a truck or an automobile to be transported thereby and to be driven from the engine of the vehicle. It will of course be understood that for the purposes indicated, the vehicle is at rest when the pump is in operation although it might be adapted for use in spraying apparatus in which case the vehicle might be in motion. For various reasons, it is highly desirable that the several parts be arranged as compactly as possible.

In the installation of the apparatus illustrated, the discharge valve designated generally by the numeral 1 is located in front of and closely adjacent to the radiator grill 2. The pump designated generally by the numeral 3 is mounted on the chassis of the vehicle, a portion thereof being indicated at 4. The driving transmission 5 is connected to the pump through the shaft 6. This transmission 5 has driving connection with the engine of the vehicle not illustrated.

7 is the main intake of the pump which is provided with a removable cap or closure 8. A booster or tank connection 9 is provided, this being controlled by the valve 10. The booster tank is carried by the vehicle and is only designed to be used to supplement the main source of water or in the event a main source of water is not available and of course would only have a limited capacity.

The pump is provided with an automatic priming means, the primer being indicated at 11 which is connected to the pump through the valve connection 12. The detail of the primer forms no part of my present invention and is therefore not illustrated. A pump pressure gage is shown at 13.

The discharge valve casing 14 is provided with a bottom flange 15 which is bolted to the flange 16 of the valve seat member 17 having an upwardly facing valve seat 18. This valve seat member 16 is threaded into the discharge 19 of the pump 3 so that the water from the pump is discharged upwardly to the discharge valve.

The discharge valve casing is provided with two discharge outlets 20 provided with couplings 21 for the atttachment of hose thereto. These couplings 21 are provided with caps 22 which it is intended should be used when the apparatus is not in use so as to protect the valve parts. Chains 23 are provided to prevent loss of these caps.

The rotary valve 24 is rotatably mounted within the valve casing to cooperate with the wall thereof. This valve is provided with ports 25 so proportioned and arranged so that either one or both of the outlets 20 may be connected with the discharge of the pump—that is, they may be selectively connected or both connected or both cut off.

The valve 24 is provided with a stem 26 projecting through the top of the housing, the stem being provided with a packing 27 and a suitable packing gland 28. The stem is provided with a vertically slotted head 29 in which the handle 30 is pivotally mounted at 31, so that the handle may be swung from one side to the other of the stem.

The head 29 is provided with a depending arm 32 having a detent ball 33 and spring 34 arranged in the bore 35 in a radial extension 36 on the lower end of the arm. This detent coacts with an index member 37 mounted on the upper end of the valve casing below the packing gland, the index member having recesses 39 receiving the detent. The extension 36 serves as an index or position indicating finger so that no matter in which position the handle 30 may be, the operator can determine by inspection of the index finger 36 what the position of the valve is.

The detent 33 not only serves to aid the operator in determining the proper location of the valve—that is, to indicate that it is in its fully adjusted position either entirely off or to connect one or the other of the discharge openings but it also prevents the valve being shifted by vibration. The index member 37 is provided with recesses 39 to receive the detent 33.

With the parts thus arranged, the valve may be rotated in its adjustment the full 360° notwithstanding its close proximity to a part such as the grill 2 in the embodiment illustrated as the handle may be swung from one position relative to the stem to a diametrically opposite position and the valve operated with it in either position, the index member 36 indicating to the operator what the position of the valve is.

The poppet check valve 40 is provided with a stem 41 extending into the bore 42 of the valve stem 26 which constitutes a guide for the poppet valve. This poppet valve 40 is provided with a facing 43 coacting with the valve seat 18. The poppet valve is within the discharge valve and serves to close the discharge of the pump during the priming of the pump—that is, when the pump is subject to suction of the primer 11 to remove the air therefrom and lift the water into the pump to prime the same. This poppet check valve 40 is lifted from its seat by the water discharged from the pump.

In the preferred embodiment, the housing of the transmission 5 is water jacketed and is connected to a port 44 of the valve casing by means of a conduit 45 having a regulating valve 46 therein, the conduit 45 being connected to the top of the transmission casing water jacket while the bottom of this jacket is connected by the conduit 47 to the water jacket of the engine not illustrated.

It will be appreciated that the water cooling system of an automotive vehicle engine such as a truck or automobile is not designed for effective cooling of the engine with the vehicle standing for a considerable period as would be the case in operating the pump either as a fire apparatus or in other work such as indicated. By this arrangement, the cooling water is supplemented or additional water is circulated through the cooling system or engine and through the transmission casing and the excess water supply is allowed to discharge from the overflow pipes of the radiator of the engine cooling system. This is not shown as the operation will be clear.

By reference to Fig. 2, it will be noted that the port 44 is located so that the water discharged therethrough must pass around the lower portion of the valve 24 and this valve is cut away or beveled at 49 to permit the water to flow below the valve casing to this discharge port. The lower end of the valve is a fairly close fit to the valve seat member. I have illustrated this space as considerably exaggerated in dimension. It serves as a screen to prevent sediment and particles of substantial size passing to the cooling system in the event this space or opening becomes clogged.

I have illustrated and described my improvements in an embodiment which I consider very desirable and one which is commerically very practical. I have not attempted to illustrate or describe various other embodiments and adaptations as it is believed that suitable adaptation will be clear to those skilled in the art from the structure and disclosure which I have made. It should be understood that the foregoing terminology is used descriptively rather than in a limiting sense and with full intention to include equivalents of the features shown and described within the scope of the following claims.

Having thus described my invention, what I claim as new and desire to secure by Letters Patent is:

1. In a structure of the class described, the combination of a valve casing adapted for connection at its lower end with the discharge of a pump and provided with a pair of discharge passages, a rotary cylindrical valve open at its lower end and having a pair of discharge ports positioned adjacent said passages so the valve may be adjusted to open either or both or to close both, said valve being provided with a stem projecting through the top of the valve casing, a slotted head for said stem, a handle pivoted in said slot for swinging adjustment in a plane substantially parallel to the stem axis and between extreme positions at right angles to the axis of the stem, said head being provided with a depending arm terminating in a radially disposed index finger having an inwardly facing bore therein, a spring actuated detent arranged within said bore, and an index member on said valve casing with which said detent coacts.

2. In a structure of the class described, the combination of a valve casing adapted for connection at its lower end with the discharge of a pump and provided with a pair of discharge passages, a rotary cylindrical valve open at its lower end and having a pair of discharge ports positioned adjacent said passages so the valve may be adjusted to open either or both or to close both, said valve being provided with a stem projecting through the top of the valve casing, a slotted head for said stem, and a handle pivoted in said slot for swinging adjustment in a plane substantially parallel to the stem axis and between extreme positions at right angles to the axis of the stem, said head being provided with a depending arm terminating in a radially disposed index finger.

3. In a structure of the class described, the combination of a valve casing adapted for connection at its lower end with the discharge of a pump and provided with a pair of discharge passages, a rotary cylindrical valve open at its lower end and having a pair of discharge ports positioned adjacent said passages so the valve may be adjusted to open either or both or to close both, said valve being provided with a stem projecting from said valve casing, a handle pivoted to said stem for swinging adjustment in a plane substantially parallel to the stem axis and between extreme positions at right angles to the axis of the stem, an index member rotatable with said valve, a detent for said index member, and an index member on said valve casing with which said detent coacts, in either extreme position of the lever.

4. In a structure of the class described, the combination of a valve casing adapted for connection at its lower end with the discharge of a pump and provided with a pair of discharge passages, a rotary cylindrical valve open at its lower end and having a pair of discharge ports positioned so the valve may be adjusted to open either or both or to close both said discharge passages, said valve being provided with a stem projecting from said valve casing, a handle pivoted to said stem for swinging adjustment in a plane substantially parallel to the stem axis and between extreme positions at right angles to the axis of the stem, and an index member mounted independently of said level and rotatable with said valve.

5. In combination with a valve casing and a rotatable multiple discharge port valve therein which is rotated in the neighborhood of 360° in the selective operation thereof and provided with a stem coaxial therewith for effecting said rotation, a handle pivotally mounted on said stem for swinging movement in the plane of the stem axis between extreme positions at right angles to said stem axis, an indicator connected to the stem for rotation therewith, and fixed means on said valve casing coacting with said indicator in indicating the angular positioning of the valve as a result of rotation of said stem, in either swingably obtained position of the handle, said indicator having a spring detent coacting with said last named means to maintain the angular positioning of the stem.

6. In combination with a valve casing and a rotatable multiple discharge port valve therein which is rotated in the neighborhood of 360° in the selective operation thereof and provided with a stem coaxial therewith for effecting said rotation, a handle pivotally mounted on said stem for swinging movement in the plane of the stem axis between extreme positions substantially at right angles to said stem axis, an indicator connected to the stem for rotation therewith, and fixed means on said valve casing coacting with said indicator in indicating the selective angular positioning of the valve ports as a result of rotation of said stem, in either swingably obtained positions of the handle, on opposite sides of the stem axis.

7. In a structure of the class described, the combination of a valve casing having a valve rotatable therein throughout a substantial arc in the rotative manipulation thereof, said valve being provided with a stem projecting axially and externally of said casing and having a slotted head, a valve actuating handle pivoted in the slot of said head for swinging adjustment in a plane substantially parallel to the stem axis and between different operative positions at right angles to the axis of the stem, and an indicating member rotatable with said valve and disposed externally of said casing for visually indicating the rotatably adjusted position of the valve regardless of the positioning of said handle in either of said different positions thereof.

8. In combination with a valve casing and a rotatable multiple discharge port valve therein, which is rotatable through a substantial arc in the selective operation thereof and provided with a stem coaxial therewith for effecting said rotation, a handle pivotally mounted on said stem for swinging movement in a plane substantially parallel to the stem axis and between extreme positions at a substantial distance on opposite sides of the stem axis, means for releasably retaining said valve against rotation in selective positions thereof in either of the positions of said lever on opposite sides of the stem axis, said means including a part rotatable with said stem.

ADRIAN P. ADNEY.